July 18, 1950     J. E. CLARK ET AL     2,515,337
METAL TO GLASS SEAL AND METHOD OF PRODUCING SAME
Filed June 24, 1947     2 Sheets-Sheet 1
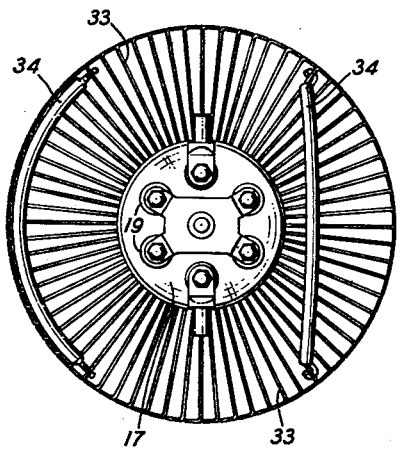
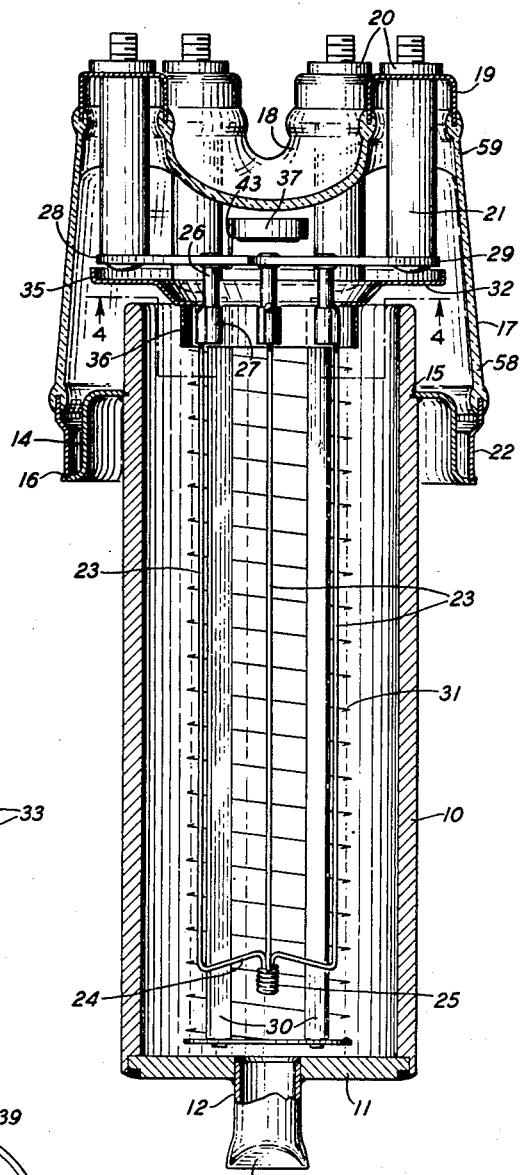
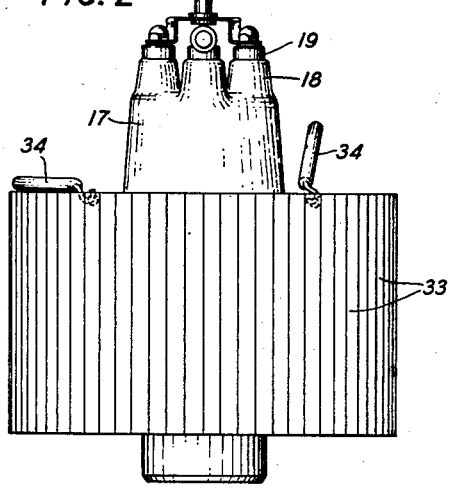
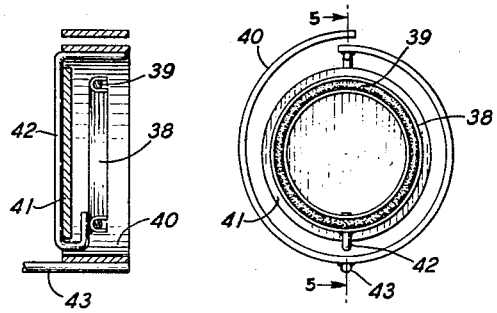
INVENTORS: J. E. CLARK
V. L. RONCI
J. W. WEST
BY
ATTORNEY July 18, 1950  J. E. CLARK ET AL  2,515,337
METAL TO GLASS SEAL AND METHOD OF PRODUCING SAME
Filed June 24, 1947  2 Sheets-Sheet 2
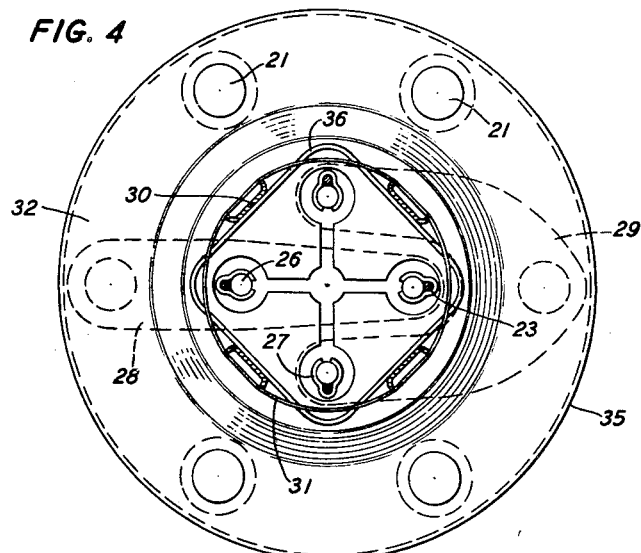
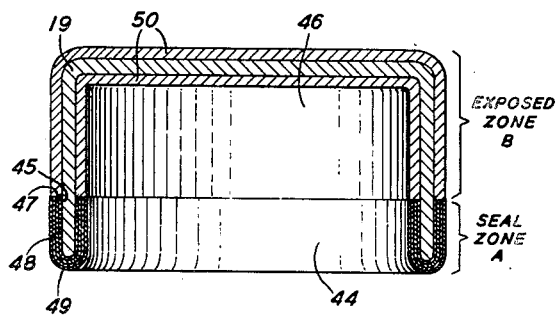
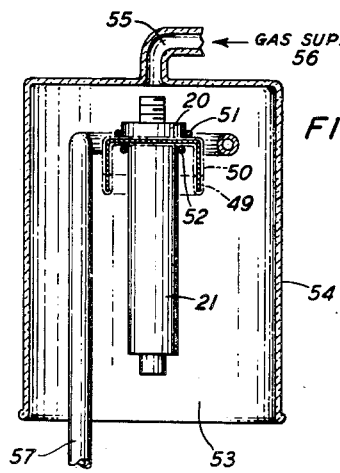
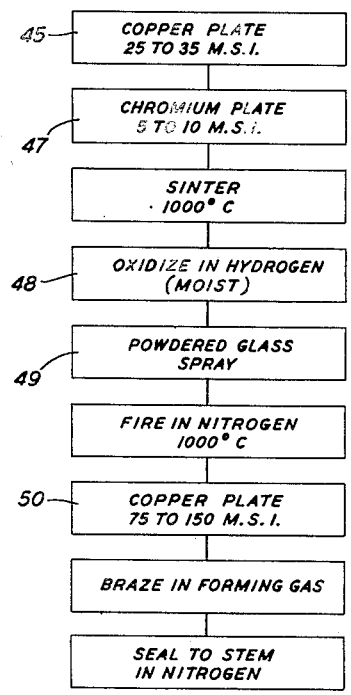
INVENTORS: J. E. CLARK
V. L. RONCI
J. W. WEST
BY
ATTORNEY Patented July 18, 1950

2,515,337

UNITED STATES PATENT OFFICE 2,515,337

METAL TO GLASS SEAL AND METHOD OF PRODUCING SAME

James E. Clark, Williston Park, Victor L. Ronci, New York, and John W. West, Jackson Heights, N. Y., assignors to Bell Telephone Laboratories, Incorporated, New York, N. Y., a corporation of New York Application June 24, 1947, Serial No. 756,706

9 Claims. (Cl. 250—27.5)

This invention relates to high power electron discharge devices and more particularly to glass to metal seals in such devices of the external anode type especially suitable for use in frequency modulation transmission systems.

In ultra-high frequency devices of the electronic discharge type and particularly when high voltages are utilized in the generation of power outputs of the order of 10 kilowatts, the energy fields extend within and about the enclosing vessel of the device and create heating effects. These may cause substantial losses in the operation of the device or fracture of the glass portion of the vessel by weakening the glass either through differences of pressure or leakage at the seals adjacent the metal elements joined to the glass portion.

The high frequency current usually follows a surface or skin path on the glass and metal components and, if the glass composition employed in the vessel wall contains conducting ingredients, the high frequency fields produce intense heating of the glass which leads to implosion of the vessel due to the pressure difference external to the device. Similarly, if high resistance metal components are employed in combination with glass for sealing metal terminals in the vessel and these components are of small area, the high frequency energy may cause a sufficiently high heating effect by cumulative absorption without efficient dissipation, to crack the glass at the sealing joints.

One primary object of this invention is to overcome these difficulties in high power electronic discharge devices of the external anode type.

Another object of the invention is to control the high frequency fields so that the efficiency of the discharge device is materially enhanced.

A further object of the invention is to induce the generated heat caused by the high operating energy, to pass to cooler portions of the device where adequate dissipation is secured.

Another object of the invention is to overcome high surface tension between the glass portion of the vessel and the metal components sealed thereto so that hermetically tight seals are produced at the junction of the different materials.

A further object of the invention is to prevent deleterious effects to prepared terminals when component parts are secured thereto under high temperature conditions.

A still further object of the invention is to increase the life and efficiency of the device by maintaining a high vacuum in the enclosing vessel so that occluded gases are entrapped and prevented from altering the characteristics of the device.

Another object of the invention is to facilitate the manufacturing technique in the assembly and mounting of the electrodes and vessel components to reduce losses due to defective parts.

A further object of the invention is to obtain methods of assembly which increase the electrical and insulating properties of the various components entering into the construction of the device.

These objects are attained in accordance with the various aspects of the invention, in a typical embodiment, in an external anode type device or tube in which a hollow anode of large surface area forms a portion of the enclosing vessel and is joined to an insulating portion supporting the internal electrodes, such as a cathode and a control electrode, which are mounted on terminals extending from the insulating portion.

One of the difficulties of operating with high voltage, high frequency currents is the destructive stray fields developed within the envelope or enclosing vessel of the device particularly when the vessel is of composite construction, i. e. includes metal and glass portions. If the metal portions are of small area and formed of high resistance material, such as cap terminals of a nickel-iron-cobalt alloy known commercially as "Kovar," the heating currents induced in the metal raise the temperature of the metal to dangerous values, particularly at the sealing junction with the glass material. The thermal differences of the glass and metal may be so great that the glass develops cracks and strains which eventually destroy the hermetically sealed joint between the metal and glass portions. Furthermore, the prevalence of heating at the sealing joint is accentuated when the metal is embedded in the glass to form the seal since the heat cannot be readily dissipated by radiation at this region.

These difficulties are overcome in accordance with one feature of this invention by forming a composite surface film on the portion of the metal components in contact with the glass material to provide a conductive metal within the sealing area of low resistance so that injurious heating effects are avoided. While the low resistance metal film prevents destructive heating it is unstable when heated to high temperatures and therefore must be protected by a stable metal layer which, however, has high surface tension properties when oxidized so that it is incompatible with glass during the wetting or fusing operation to form the seal. The difficulties involved are surmounted by forming a glaze over the film as a flux or bond between the film and glass material of the stem to which the metal is sealed.

Another feature of the invention relates to the prevention of peeling of the conductive metal film from the metal to which it is applied to insure a tenacious bond between the film and metal. This is achieved by a sintering operation to make the metal film firmly adherent to the base metal.

A further feature involved in dissipating the heating energy from the sealing area of the terminals is the provision of a heavy coating of a high heat conductivity metal on the remaining surface of the alloy terminals beyond the sealing area to distribute the heat and cool the seals by radiation of heat to the atmosphere. This is accomplished by applying a heavy plating of copper on the inner and outer surfaces of the terminal beyond the sealing area so that the heat is conveyed away from the seal and dissipated to the adjacent vacuum or air space.

Another feature of the invention relates to the assembly of the terminal prior to the sealing operation to attach coupling components to the terminal structure. The terminal is provided with inner and outer posts which are brazed or soldered to the base portion and the temperatures encountered during the brazing operation ordinarily are detrimental to the vitreous glaze film applied to the edge of the terminal since the heat conducted to the glaze produces softening of the fused glass coating and results in the formation of air bubbles or entrapped gas upon cooling. This condition is avoided by performing the brazing operation in a protective environment of a forming gas mixture of nitrogen and hydrogen which sufficiently dissipates the heat generated in the terminal and prevents the glaze reaching the softening temperature or, if softening occurs, prevents occlusion of gas in the sealing joint.

After the terminals are processed, the sealing thereof to the stem may proceed in accordance with a definite technique developed and disclosed in other applications pertaining to these phases of the fabrication of the assembly. This results in hermetically sealed junctions between the glass stem and the metal components joined thereto to form the insulating portion of the device, the sealing operation being preferably performed in a nitrogen atmosphere.

A further feature of the invention relates to the inclusion of a getter assembly in the vessel, which is activated after the device is completely assembled. This arrangement involves a shielded getter ring supported centrally adjacent the base of the stem, the ring being heated by high frequency induction. The shielding encompassing the ring includes an incomplete band and a covering disc to prevent the metal vapor of the getter being projected toward the electrodes and supporting elements in the device while permitting the escape of the vapor to an isolated portion of the stem where it is condensed as a film to trap the occluded gases in the device. Since the shield surrounding the getter is an incomplete structure, high frequency energy does not substantially affect it or prevent the energy from being induced in the ring which contains the vaporizable material.

A further feature in the construction of the electrode assembly relates to the distribution of shielding members adjacent the internal rim of the anode to physically protect the seals from the high voltage field of the anode and distribute the turbulent high frequency energy adjacent the glass wall so that corona effects, which might result in puncture of the glass by excessive localized heating, are prevented. In a similar manner, arcing fields are avoided between the anode edge and the filament junction adjacent thereto by a rectangular ring shield supported by the grid assembly intermediate the anode and filament.

These and other features and advantages of this invention will be more clearly apparent from the following detailed description when considered with the accompanying drawings. In the drawings:

Fig. 1 is a top plan view of a high power discharge device embodying various features of this invention;

Fig. 2 is a view in elevation of the device of Fig. 1;

Fig. 3 is an enlarged view in cross-section showing the detailed electrode assembly of the device and showing also the seals in simplified form;

Fig. 4 is a plan view, taken along line 4—4 of Fig. 3, of the internal mounting assembly showing the relationship of the components within the stem;

Fig. 5 is an enlarged cross-sectional view of the getter mounting assembly shown in position in the device of Fig. 3;

Fig. 6 is a bottom plan view of the getter mounting of Fig. 5;

Fig. 7 shows in cross-section an enlarged terminal cap embodying the composite films of this invention and the detail construction of the terminal employed in the stem of Fig. 3;

Fig. 8 is a view partly in cross-section of the assembly utilized in brazing the posts to the cup terminal, showing the set-up prior to joining the elements together; and Fig. 9 is a diagram indicating the series of operations performed on the terminals, as shown in Figs. 7 and 8.

Referring to the drawings, and particularly to Figs. 1 to 4, inclusive, the high voltage discharge device therein illustrated is a triode having an anode, a control electrode and a filamentary cathode, all coaxially related, with the cathode and control electrode extending within the anode and being supported by a glass base portion sealed to the anode.

The anode is preferably formed of a copper sleeve or cylinder 10 with a copper closure plate or disc 11 sealed across one end. The disc is provided with an outwardly extending metal tubulation 12, which is sealed off at 13 after the device is completely assembled and evacuated to a low pressure. The outer surface of the other end of the copper sleeve anode is reduced in diameter to provide a close-fitting joint to a copper plated steel ring 14. The base of the undercut portion and the end of the ring are provided with internal grooves 15 and 16, respectively, to form pockets for preformed solder rings of high melting point, for example 37 per cent gold and 63 per cent copper.

The internal electrodes, namely the cathode and control electrode or grid, are insulatingly mounted in relation to the anode by being supported from a vitreous base portion or stem. This portion includes a "hard" glass cup member 17, preferably formed of borosilicate glass, of tapered configuration, having a plurality, for example six, of integral tubular extensions 18 projecting from the closed end of the cup, the extensions being equally spaced in a circle around the base of the cup. These extensions carry metallic cup terminals 19, preferably of "Kovar" alloy, a nickel-iron-cobalt composition having substantially the same thermal coefficients as the glass to which it is sealed to form an hermetic joint. A threaded button 20 of steel, preferably copper-plated, is brazed to the outer flat surface of each terminal and a similarly plated nickel post 21 is anchored concentrically within each cup by gold-copper solder brazing on the inner surface, to extend parallel to the axis of the stem. Two oppositely disposed posts are slightly shorter than the remaining posts and all of them are provided with a reduced shoulder on the free end for mounting the electrodes rigidly within the stem. A large diameter "Kovar" sleeve 22 is sealed to the open end of the cup stem 17 and the free edge is joined to the reentrant steel ring 14 for mounting the stem assembly integral with the anode.

The cathode structure involves a plurality of rigid filamentary strands 23, of heavy gauge tungsten or thoriated tungsten wire, and these strands are heated to emission temperature to supply copious electron flow toward the anode surface. The strands are formed with a long straight portion parallel to the anode surface and provided with inwardly bent knee portions 24 which merge together at the center, with the ends coupled together by a wire sleeve 25 to provide a rigid welded joint. The opposite ends of the filament strands are anchored to posts 26 by metallic sleeves 27 and the posts are supported on a pair of oppositely disposed arms 28 and 29, shown in dotted outline in Fig. 4, which are rigidly secured to the short posts 21 in the stem.

A control electrode or grid is interposed between the emission source or cathode and the anode, to regulate the flow of electrons to the anode. The grid includes a plurality of channel supports 30 and a wire helix 31, preferably of fine molybdenum wire, wound and supported on the channel supports with the grid coaxially spaced around the cathode. The channel supports are attached to a metallic disc or shield 32 which is rigidly supported on the remaining posts 21 in the stem and is provided with a cross-shaped cutout portion in the central area of the shield to clear the posts supporting the filaments or cathode. The anode is surrounded by a copper fin radiator assembly 33, as shown in Fig. 2, which provides a large radiation surface for dissipating heat energy from the anode during operation. The detailed assembly and construction of the device and the components entering therein, as heretofore described, is more specifically disclosed and claimed in the application, Serial No. 703,432, filed October 15, 1946, by V. L. Ronci and J. W. West.

In order to attain the highest efficiency in the dissipation of heat energy in the radiator structure, it is usual to mount the radiator in a suitable duct which conveys forced air through the fin assembly. If the duct and fin assembly are close fitting to increase the efficiency of the fluid circulating system, some means must be provided for inserting and removing the device from the duct without damage to either. This is accomplished by providing arcuate pivoted handles 34 on the top of the radiator assembly to facilitate the removal and insertion of the high power device in the duct mounting. These handles are pivoted on opposite ends in spaced relation on suitable fins of the radiator assembly and in use may be erected to a vertical position for handling the device in the duct. When not in use the handles lie flat adjacent the periphery of the fin assembly, as shown in Figs. 1 and 2, in which one handle is so shown while the other is in upright position.

To distribute the high frequency fields over a wider area of the glass stem and thereby prevent concentrated heating effects of the glass, the grid shield 32 is provided with a turned edge 35 which projects toward the terminals so that the periphery of the shield disposed toward the high potential anode end adjacent the shield presents no sharp surfaces which engender the concentration of arcing fields close to the glass wall. By turning the edge away from the anode, the high frequency fields from the anode are distributed over a greater portion of the glass wall so that localized heating effects and softening of the glass are prevented, thereby avoiding puncture or implosion of the glass of the stem.

The anode high frequency field is also shielded from the couplings of the filament assembly by a rectangular-shaped shield or collar 36 which extends from the disc shield 32 and surrounds the coupling straps 27 on the posts 26 of the filament assembly. The rectangular collar is anchored to the grid assembly by being welded to the flat sides of the channel supports 30, as shown in Fig. 4.

Another improvement included in the device involves a getter mounting 37 centrally supported in the stem, as shown in Fig. 3, and facing the dome portion of the stem, which provides a clear area on which the getter film may be deposited without detrimental results due to short-circuit or leakage paths. The getter assembly of this invention is shown more clearly in Figs. 5 and 6 and includes an internal hollow ring 38 of substantially semicircular or U-shaped cross-section, containing a suitable getter material 39, such as nickelated barium or an exothermic reaction mixture of barium and magnesium oxide. The ring is surrounded by a cylindrical metallic band or shield 40, preferably of nickel, in the form of an incomplete loop which provides a peripheral shield for preventing the radiation of vapor in a radial direction from the internal ring 38. The getter mounting also includes a disc shield 41 disposed between the internal ring 38 and the electrode assembly to prevent radiation of vapor toward the electrodes. The internal ring 38 and the disc 41 are supported from the incomplete shield structure by a bent wire support 42 and the peripheral shield 40 is supported from the electrode structure by a wire support 43. This construction is adopted to provide a getter assembly which may be activated by high frequency currents supplied by an external coil surrounding the stem 17 of the device, to inductively heat the getter support ring 38 to the vaporization point of the getter material 39 yet which will not heat the incomplete ring 40 surrounding the internal ring due to the incomplete circuit provided by this ring or shield. The vaporizable material may be adequately heated to clean up the residual gases contained in the device after the complete evacuation thereof, to fix these gases in a film on the dome portion of the stem. The vapors released by the activation of the getter are not permitted to injuriously affect the metallic parts of the electrode structures within the stem, due to the complete shielding surrounding the getter ring. While the getter ring is completely and mechanically shielded to localize the deposition of the film on the stem, the getter is still capable of being heated by high frequency induction currents since the shielding remains cool and is not affected by the high frequency induction currents employed in energizing the getter ring within the shielding structure.

While the general structure of the device follows conventional lines of similar devices, many difficulties are encountered in the high frequency field, for example operation in the 100 megacycle range. One of the primary factors discovered when operating with ultra-high frequency current is the heating effect induced in the metal and glass components of the device. This effect builds up disruptive discharges and leakage energy which cause the device to fail in service and impair the efficiency and power output. The heating effect is especially prevalent at the sealing joints between the glass and metal terminals in the stem. One of the factors causing this effect is that the alloy terminals present a small closed loop at the sealing joint, due to the cup-shape of the terminal, and the flow of high frequency current along the skin of the loop circuit generates cumulative fields of sufficient density to cause heating which raises the temperature of the seal beyond the thermal transformation point of the glass. Fracture results due to the abnormal stresses produced in the vicinity of the seal. Another factor contributing to this condition is the character of the seal in which the metal is embedded in the glass which deters heat dissipation from the affected area so that the metal is inadequately cooled by contact with the surrounding air. Still further causes affecting the heating influence are the high resistance characteristic of the metallic alloy and the occlusion of metallic or conductive substances in the glass adjacent the sealing area which intensify or amplify the heating effect along the sealing joint and aggravate the condition within the zone of influence of the heating currents.

Heretofore, it was the practice in sealing the edge of the nickel-iron-cobalt alloy terminals in glass of similar thermal coefficients, to oxidize the metal along the sealing zone to provide a good bond between the metal and glass. The oxidizing treatment, which is performed at high temperature, may cause embrittling of the metal which eventually results in vein cracks in the metal wall. These cracks in time produce leakage in the seals and the destruction of the device with which they are associated. When embrittling is avoided by copper-plating and oxidizing the copper at a lower temperature, for bonding the seal, the copper oxide is unstable since it does not withstand the necessary sealing temperature without completely oxidizing or disappearing by flaking or diffusion.

All of these detrimental results are eliminated in the seals constructed in accordance with this invention, by retaining the beneficial attributes of the alloy and glass thermal characteristics to produce efficient gas-tight seals but controlling the processes of fabrication and the formation of the sealing union to overcome high frequency heating effects in the sealing zone. This is accomplished by building up a metal-oxide layer junction between the alloy and glass which utilizes a low resistance path for the flow of high frequency currents and a stable metal-oxide bond to the glass of the seal which eliminates conductive dissemination into the glass during the fusing operation. In addition the embedded metal zone of the terminal is kept relatively cool by heat radiation to a heavy metal layer having a high heat conductivity characteristic, on the remaining area of the terminal so that cumulative heating effect is prevented and normal thermal conditions ensue in the sealing zone. While the metal-oxide bond is stable during fusing to avoid conductive materials distributed in the glass, it has a high surface tension factor which prevents efficient wetting to glass during the sealing operation. This is overcome by applying a priming flux or glaze over the oxide area which readily fuses to the molten glass during the seal forming procedure.

An intermediate step in the formation of the junction bond relates to the heat treatment of the low resistance metal layer to effect a tenacious union with the underlying metal so that peeling is avoided.

Another preliminary operation before the final sealing takes place is the brazing of supporting components to the terminal, which is performed at a high temperature to rigidly affix the components to the terminal. This is performed in a forming or protective gas mixture so that oxidizing conditions do not detrimentally affect the priming glaze on the sealing zone of the terminal which is apt to develop bubbles after cooling, due to hydrogen gas occlusions.

A phase of the combination which alleviates the destructive effect of the high frequency current field extant within the device during operation is the utilization of a blown stem of relatively thin cross-section and formed of low-loss glass material, to counteract the corona effect in the glass which results in concentrated heating and eventual failure.

By following these improvements in the fabrication of the device, the stray high frequency currents can be rendered impotent so that they do not reduce the efficiency of operation or the power output of the device. The features, improvements and processes relating to the seals, in accordance with this invention, will be set forth in detail hereinafter in connection with the description of Figs. 7 to 9, inclusive, which show the detailed construction of the terminal in exaggerated fashion, to clearly depict the protective coatings applied to the base alloy, the brazing set-up for attaching the posts to the processed terminal and the sequence of operations in forming and sealing the terminals to the stem. These steps will be correlated with the subsequent mounting of the terminals in the stem structure, as shown in Fig. 3.

As shown in Fig. 7 the "Kovar" cup terminal 19 is divided into separate zones to indicate the sealing zone A and the exposed zone B which represent the portions of the terminals, as shown in Fig. 3, with the zone A embedded in the glass seal and the zone B which constitutes the largest surface area exposed to the surrounding media, such as the high vacuum space within the stem and the atmosphere external to the terminal. The processing of the terminal 19 to produce the efficient sealed joint of this invention will be described in detail with reference to the "Kovar" terminal as shown in Fig. 7 but is understood to apply with equal effect to the "Kovar" ring 22 sealed in the opposite end of the stem, although this element is not subjected to the same intensity of heating current as the terminals, due to its large diameter and its position beyond the intense heating area within the active zone of the anode. However, since this element has an embedded seal, it is desirable to treat ring 22 in the same manner as the terminals 19 to dissipate the heating effect in the seals caused by the stray high frequency fields generated within the device. In the description of the various coatings applied to the cap terminal 19 in Fig. 7, reference will be made to Fig. 9 and the identity of the various coatings may be more easily recognized by applying the same reference characters where necessary in both figures, thereby simplifying the disclosure.

The initial step in applying the protective coatings to the Kovar cap terminal 19 involves the application of a thin film of conductive metal, preferably of copper, to the sealing zone 44. This film may be in the form of copper plating 45 of approximately 25 to 35 milligrams per square inch which results in a thin film of about ¼ mil thickness along the sealing zone area on the inner and outer surfaces thereof. This layer forms the high frequency conductive path for the stray currents which cause heating and provides a low resistance metal which protects the high resistance alloy base metal forming the terminal. If desired, the remaining area 46 of the terminal may be provided with a resist coating, not shown, according to practices in the plating art, to prevent the film extending beyond the sealing zone. The terminal is then washed and dried and transferred to a chromium plating bath to form a superimposed coating 47 of chromium over the copper film at the rate of 5 to 10 milligrams per square inch to provide a protective layer of chromium metal over the copper film on the inner and outer surfaces of the zone 44. This surface 47 forms a stable metal which is not easily affected by the sealing temperatures in forming the joint with the glass. After washing and drying, the terminal may be heated by high frequency induction or in a suitable oven supplied with pure hydrogen to a temperature of approximately 1000° C., to sinter the chromium plating to the underlying metal surface, and thereby form a tenacious bond which will not be subjected to peeling and flaking due to differences of temperatures experienced under operating conditions. After the sintering treatment the terminal is placed in a "wet hydrogen" oven in which moisture is added to the hydrogen supply to provide a slightly oxidizing atmosphere and the terminal is heated to a temperature of approximately 1000° C. for 20 minutes to produce a stable chromic oxide coating 48 on the surface of the chromium plating 47. The chromic oxide is green in color and forms a shiny film over the chromium layer, which serves as the oxide bond between the metal and glass forming the seal. However, due to the high surface tension of the oxide layer, it is not easy to weld molten glass to the sealing zone very readily. This difficulty is overcome, in accordance with this invention, by applying a glaze or flux 49 over the surface of the terminal defined as the sealing zone 44. This coating is produced by mixing powdered glass, specifically borosilicate glass, such as "Corning" 7052 type, preferably of a particle size of approximately 325 mesh, with a decomposable resin binder such as "Acryloid" A10, a composition of polymerized methyl methacrylate in solution, together with a solvent such as "Cellusolve Acetate" a composition of diethylene glycol monobutyl ether acetate. When the glass powder, binder and solvent are thoroughly mixed to the consistency suitable for spray gun use, a glass coating 49 is applied over the chromic oxide film to form a flux layer, the remaining area of the terminal 46 being masked to avoid the application of the spray beyond the desired portions of the terminal defined by the sealing zone 44.

After the spray is applied, the terminal is fired in an oven supplied with nitrogen and heated to the fusing temperature of the glass which is approximately 1000° C., for approximately 10 minutes. The temperature is raised gradually so that the solvent and binder are completely removed at about 400° C. and the powdered glass fuses to a glaze coating 49 at the firing temperature of 1000° C. After the glaze coating is completed, the resist coating is removed from the exposed portion 46. The sealing zone 44 may be provided with a resist coating (not shown) before the next operation. This involves the copper plating of the exposed zone 46 at the rate of 75 to 150 milligrams per square inch to form a heavy copper plating 50, about ½ mil thick, over the inner and outer surfaces of the terminal 19, to provide a coating of high heat conductivity metal over the exposed area of the terminal, the thick coating 50 having a cross-section substantially equal to the multiple layers on the sealing zone 44 of the terminal. When the terminal is thoroughly washed and dried and the resist coating removed from the glazed layer, the terminal is ready for the next operation.

The processing of the terminal 19 to form the multiple layers of different metals and oxide bond over the whole surface thereof may be performed prior to the fixation of the post 21 and stud 20 to the terminal, since the heavy copper plating can be applied over the whole exposed area of the terminal to increase the radiation efficiency of the exposed surface although it is preferable to affix the post and stud to the terminal prior to the final heavy copper plating. However, since the post and stud must be secured rigidly to the terminal at a high temperature during the brazing operation, certain difficulties are encountered due to the development of bubbles in the glaze layer since the brazing temperature is close to the fusing temperature of the glass forming the glaze coating.

In brazing the terminal posts to the cap member 19, the terminal assembly is mounted, as shown in Fig. 8, in a suitable fixture together with solder rings 51 and 52 of gold-copper alloy, surrounding the edges of the stud 20 and post 21, respectively, adjacent the outer and inner surfaces of the terminal cap. The mounted assembly is placed in an oven or the open end 53 of a glass bell jar 54 having a bent tubulation 55 at the top for supplying an inert gaseous atmosphere 56 at low pressure to form a protective cloud in the jar during the brazing operation. In addition, a water-cooled single turn high frequency induction coil 57 is inserted in the jar with the coil portion concentrically surrounding the terminal assembly in the vicinity of the copper solder rings. Energy is applied to the coil to produce a heating temperature of 1000 to 1050° C. to melt the solder rings and rigidly braze the stud and post thereto in contact with the surfaces of the terminal cap. While the high temperature necessary to the brazing operation is within the range of the fusing temperature of the glass or glaze coating on the edge of the terminal cap, most of the heat energy is dissipated in the large surface masses of the stud, post and mounting fixture so that the glaze is not seriously affected. However, the glaze coating must be protected during the brazing operation to prevent occlusion of gas bubbles in the glaze coating. This is accomplished by flowing a forming or protective gas mixture through the bell jar or oven during the brazing operation. This mixture consists of 85 per cent nitrogen and 15 per cent hydrogen, to provide a non-oxidizing environment during the formation of the braze and to prevent the entrance of oxidizing impurities into the glaze coating which would detrimentally affect the coating by the appearance of bubbles or entrapped gases in the thin glaze coating.

Before discussing the nature of the seal between the Kovar alloy parts and the glass stem, some explanation is advisable to indicate distinctions between the present construction and prior devices, with respect to the stem composition and its configuration to counteract heating effects at high frequency energy fields encountered during the operation of the device in high frequency-high voltage applications. The cup stem of the usual high voltage electronic discharge device is a molded or cast stem of hard borosilicate glass, such as 7052 glass, which has substantially the same thermal coefficients as the nickel-iron-cobalt alloy usually sealed thereto. This glass composition contains a certain percentage of conductive elements in the form of metallic silicates and due to the molded character of the glass the wall thickness is about .125 inch. When high frequency fields generated within the device are concentrated along any portion of the thick side wall of the stem, heating energy is cumulatively built up in the glass which eventually breaks down when the temperature reaches the softening point of the glass.

In accordance with this invention, the destructive heating effect of the glass wall of the stem is ameliorated or neutralized by employing a low-loss glass composition of borosilicate glass, such as 707 glass, which has a minimum of metallic silicates in its composition. In addition, the stem is blown in a carbon mold to provide a relatively thin wall, preferably of tapered cross-section, the thickness of the wall at the point 58, as shown in Fig. 3, being approximately .045 inch and the thickness at the point 59 being .020 inch. This provides a relatively thin wall in which the Joule effect of the high frequency current is a minimum, due to the greater radiation of heat energy in the glass and the small amount of metallic impurities in the glass composition. The taper construction is possible due to the fact that at the minimum thickness of the glass wall, the stem is strengthened by the tubular portions 18 of the stem. At the opposite end of the stem the glass is unsustained thereby requiring greater thickness than near the tubulations.

While the low-loss glass stem adequately overcomes the high frequency heating effect, it introduces another problem in the fabrication of the device in Fig. 3 due to the higher thermal coefficient of the glass composition which is $3.2 \times 10^{-6}$ inches per inch per degree centigrade and therefore does not match the expansion coefficient of the Kovar alloy which is approximately $4.45 \times 10^{-6}$ inches per inch per degree centigrade. This difficulty is overcome by joining an intermediate glass ring between the "Kovar" part and the stem 17, of 7052 glass, which matches the thermal coefficient of the Kovar alloy and readily fuses to the low-loss glass composition of the main portion of the stem. A more detailed exposition of the conjunctive ring coupling between the "Kovar" and thin glass stem portion is presented in the application Serial No. 750,146, filed May 23, 1947, and issued as Patent No. 2,504,303 on April 18, 1950 of J. E. Clark and V. L. Ronci.

As set forth in the above-identified application, the sealing of the "Kovar" terminals and the "Kovar" ring to the stem of thin wall cross-section may be performed in sequence or simultaneously, to provide a tight hermetic joint or seal between the metal and glass components of the stem structure. Aside from the mechanics of the formation and functionality of the seals between the metal and glass portions of the stem, it is believed necessary to understand the problems confronting the present applicants to explain the conditions which prevail at the seals when high frequency generated in the device is controlled by the construction of the special seals, in accordance with the invention, to circumvent destructive heating effects in the sealing union between the metal and glass portions of the device. While the edges of the "Kovar" elements are embedded in the glass union of the stem, the alloy metal per se is completely protected against the flow of high frequency current therein, due to the fact that such currents travel on the skin or outer surface of the metal element. Therefore, the high frequency currents are prevented from flowing in the high resistance alloy metal and this together with the embedded nature of the seal around the edge of the alloy contributed to the heating effect in prior seals. In constructions embodying the present invention, the glazed coating 49 on the sealing zone 44 of the terminal cup 19 after sealing to the stem is fused into the glass of the stem and, therefore, serves only as a temporary flux to facilitate the wetting of the glass of the stem to the oxide component to form a hermetic and tight joint or union with the glass.

The next skin surface exposed to the high frequency current in the sealing zone is the chromic oxide coating 48. In the fusing operation to form the seal, this oxide remains stable and does not react at the sealing temperatures with the molten glass during the sealing operation, to cause conductive impurities to be distributed through the seal and thereby engender heating effects of the glass by the high frequency current. Since the oxide film is insulating in character, the high frequency current does not flow therein within the confines of the embedded seal. The first skin conductor within the embedded seal with which the high frequency current comes in contact is the film or layer of chromium, identified as 47 in Fig. 7, over which the current can flow. While some heating effect is produced due to the small diameter closed circuit around the periphery of the cap terminal, the heat energy generated over the chromium film is continually dissipated through contact with the low resistance, highly conductive thin film of copper beneath the chromium plating and the conduction of this heat to the large radiator surface provided by the heavy copper plating 50 on the exposed area of the terminal. Therefore, cumulative heating energy never reaches a dangerous point at the conjoint surfaces of the chromium plating and the oxide bond sealed to the glass and, accordingly, temperature strains and stresses are avoided between the metal and glass elements at the sealing union between these surfaces. The alloy metal 19 performs the service of a base or core for the actual seal and due to the fact that the core metal expands and contracts at a rate similar to the glass seal in which it is embedded there is no liability of the glass and metal changes through the range of temperatures to cause strain or fracture in the hermetic seal. Consequently, the seals efficiently perform their function regardless of the intensity of the high frequency energy current generated within the enclosed device so that a relatively long life is assured in the operation of the device in service.

While the invention has been disclosed in its different aspects with respect to a particular embodiment, it is, of course, understood that various modifications may be made in the detailed structures and their association in different types of devices within the scope of the invention as defined in the appended claims.

What is claimed is:

1. A metal-to-glass seal comprising a nickel-iron-cobalt alloy cap terminal and a tubular glass member sealed thereto with the edge of the terminal embedded in the glass, the seal portion of said cap having an interposed multilayer junction between the glass and alloy including successive layers of thin coatings of copper, chromium and chromium oxide, and a fused layer of glass adjacent the terminal and said member, and the remainder of said cap having a heavy copper coating beyond said seal.

2. A metal-to-glass seal for electronic discharge devices comprising a nickel-iron-cobalt alloy cap terminal and a tubular glass member sealed thereto with the edge of the terminal embedded in the glass, the seal portion of said cap having an interposed composite junction between the glass and alloy in laminated series relation composed of films of copper, chromium, chromium oxide and a glazing layer enclosing said laminated films, and a heavy layer of copper on the remaining surfaces of said alloy cap terminal, said layer being substantially equivalent in thickness to said laminated films.

3. A metal-to-glass seal for electronic discharge devices comprising a nickel-iron-cobalt alloy cap terminal and a tubular glass member sealed thereto with the edge of the terminal embedded in the glass, the seal portion of said cap terminal having an interposed composite junction between the glass and alloy in laminated series relation composed of films of copper, chromium, chromic oxide and a vitreous glaze enclosing said films, the films being of the order of 25 to 35 milligrams per square inch for copper and 5 to 10 milligrams per square inch for chromium and oxide combined, and a copper plating on the remaining surfaces of said terminal, said plating being of the order of 75 to 150 milligrams per square inch.

4. The method of minimizing heat losses in a nickel-iron-cobalt alloy tubular element in sealing contact with a glass portion of like expansion characteristics subjected to high frequency energy fields at high voltages, which comprises protecting said alloy against surface contact with said fields by forming a low resistance metallic layer on the sealing portion of said element of film thickness, coating said layer with a chromium film, oxidizing said film in moist hydrogen, spraying a powdered vitreous composition over the oxide layer, heating to 1000° C. to reduce the sprayed coating to a glaze surface, embedding the oxide layer therein, applying a heavy heat conducting metal layer over the remaining surface of the exposed alloy element beyond said sealing portion, embedding said glaze in the glass portion in a plastic state, and fusing the glaze and plastic glass to form a tight sealed joint therebetween.

5. The method of hermetically sealing a nickel-iron-cobalt alloy cup terminal to a glass portion having similar thermal expansion characteristics, which comprises copper-plating the edge of the terminal at the rate of 25 milligrams per square inch, applying a chromium plating over said copper plating at the rate of 10 milligrams per square inch, oxidizing in wet hydrogen to form a chromic oxide coating on said plating, spraying powdered glass over the oxide coating, heating in nitrogen at 1000° C. to fuse the glass to a glaze without affecting the oxide coating, copper plating the remaining surface of said cup terminal at the rate of 75 milligrams per square inch, and sealing said glazed surface to a glass portion of a vessel to embed the edge of the alloy and multiple coatings thereon in a hermetic sealed joint to the glass vessel, the heavy copper plating being exterior to the sealed joint.

6. A shielded getter assembly for mounting in a discharge device and adapted to be heated by high frequency induction currents, comprising a closed hollow ring member containing a supply of vaporizable material, a metallic band shield of circular configuration surrounding said ring member having the ends in overlapping and spaced relation to form an incomplete loop, a disc shield covering said ring member, and a wire support extending from said band shield and supporting said disc and ring member therefrom.

7. In an electronic device, an enclosing vessel including a glass stem having a dome portion, a cathode structure centrally supported from said stem, and a getter assembly adapted to be heated by high frequency induction supported by said cathode structure adjacent said dome portion, said getter assembly including a closed hollow ring member containing a vaporizable material exposed to said dome portion, and an enclosing shield intermediate said cathode structure and said ring member whereby vaporizable material projected from said ring member is directed to the surface of said dome portion.

8. In an electronic device, an enclosing vessel including a glass stem having a dome portion, a cathode structure centrally supported from said stem, and a getter assembly adapted to be heated by high frequency induction supported by said cathode structure adjacent said dome portion, said getter assembly including a closed hollow ring member containing a vaporizable material exposed to said dome portion, a metallic band shield of circular configuration surrounding said ring member having the ends in overlapping and spaced relation to form an incomplete loop, a disc shield covering said ring member, and a support mounting said ring member, band and disc shields centrally from said cathode structure to expose said ring member to said dome portion.

9. A metal-to-glass seal for electronic discharge devices, comprising a nickel-iron-cobalt alloy cup member and a tubular glass member sealed thereto with the edge of said cup member imbedded in the glass, the sealed portion of said cup member having an interposed composite junction between the glass and alloy in a laminated series relation composed of films of copper, chromium, chromium oxide, and a glazing layer enclosing said laminated films, and a heavy layer of copper on the remaining surfaces of said alloy cup member, said heavy layer being substantially equivalent in thickness to said laminated films.

JAMES E. CLARK.
VICTOR L. RONCI.
JOHN W. WEST.

REFERENCES CITED

The following references are of record in the file of this patent:

UNITED STATES PATENTS

| Number | Name | Date |
|---|---|---|
| 1,649,907 | Mayer | Nov. 22, 1927 |
| 1,816,424 | Elsey | July 28, 1931 |
| 1,980,840 | Wright et al. | Nov. 13, 1934 |
| 2,026,335 | Scott | Dec. 1, 1936 |
| 2,193,640 | Navias | Mar. 12, 1940 |
| 2,251,062 | Lindwarm et al. | July 29, 1941 |
| 2,310,147 | Dailey | Feb. 2, 1943 |
| 2,338,538 | Pulfrich et al. | Jan. 4, 1944 |
| 2,340,362 | Atlee et al. | Feb. 1, 1944 |
| 2,385,435 | Werner | Sept. 25, 1945 |
| 2,426,467 | Nelson | Aug. 26, 1947 |
| 2,446,277 | Gordon | Aug. 3, 1948 |

FOREIGN PATENTS

| Number | Country | Date |
|---|---|---|
| 249,084 | Great Britain | July 1, 1926 |

OTHER REFERENCES

Ser. No. 209,150, Karl (A. P. C.), published April 27, 1943.